US005810452A

United States Patent [19]
Hawthorne et al.

[11] Patent Number: 5,810,452
[45] Date of Patent: Sep. 22, 1998

[54] COMPOSITE HOLLOW IRRIGATION SYSTEM TOWER SUPPORT WHEEL

[75] Inventors: Mike Hawthorne, 703 S. "K" Rd.; Clayton Higgins, 506 S. "H" Rd., both of Giltner, Nebr. 68841; Mark Wadsworth, Wichita, Kans.

[73] Assignees: Mike Hawthorne; Clayton Higgins, both of Giltner, Nebr.

[21] Appl. No.: 523,533

[22] Filed: Sep. 5, 1995

[51] Int. Cl.$^6$ ....................................................... B60B 15/00
[52] U.S. Cl. ............................ 301/43; 301/64.3; 301/64.7
[58] Field of Search ................................ 301/64.2, 64.3, 301/64.7, 41.1, 43, 52, 64.4, 64.5

[56] References Cited

U.S. PATENT DOCUMENTS

| | | | |
|---|---|---|---|
| Re. 30,030 | 6/1979 | Coran et al. ......................... | 301/64.7 X |
| D. 54,288 | 12/1919 | Stothoff . | |
| D. 296,106 | 6/1988 | Stephens ................................. | D15/28 |
| D. 316,699 | 5/1991 | Johnson ................................. | D12/213 |
| 614,907 | 11/1898 | Venner . | |
| 991,396 | 5/1911 | Ulfers .................................... | 301/43 |
| 1,360,451 | 11/1920 | Scotti ..................................... | 301/43 |
| 1,427,320 | 8/1922 | Philips ................................... | 301/64.3 |
| 1,461,888 | 7/1923 | Burrows ................................ | 301/64.3 |
| 1,534,545 | 4/1925 | Rogers ................................... | 301/64.3 |
| 1,586,425 | 5/1926 | Goodyear .............................. | 301/64.3 |
| 1,602,796 | 10/1926 | Jacobi et al. .......................... | 301/64.2 |
| 1,943,620 | 1/1934 | Murray .................................. | 301/43 X |
| 2,337,779 | 12/1943 | Sinclair ................................. | 301/64.3 |
| 3,108,838 | 10/1963 | McCleary .............................. | 301/64.3 |
| 3,158,404 | 11/1964 | Noakes .................................. | 301/64.3 |
| 3,465,766 | 9/1969 | Siebert .................................... | 137/1 |
| 3,493,176 | 2/1970 | Kinkead ................................. | 239/11 |
| 3,965,924 | 6/1976 | Kennedy ............................... | 137/344 |
| 3,993,249 | 11/1976 | Hieb ...................................... | 239/177 |
| 4,074,783 | 2/1978 | Arndt et al. .......................... | 180/14 R |
| 4,248,260 | 2/1981 | Addison et al. ...................... | 137/899 |
| 4,354,636 | 10/1982 | Hait ....................................... | 239/177 |
| 4,358,162 | 11/1982 | Schneider et al. .................... | 301/64.7 |
| 4,527,839 | 7/1985 | Fujitaka et al. ....................... | 301/64.2 |
| 4,732,428 | 3/1988 | Monte ................................... | 301/64.7 |
| 4,919,489 | 4/1990 | Kopsco ................................. | 3014/41.1 |
| 5,046,785 | 9/1991 | Bockerman ............................ | 301/52 |
| 5,154,490 | 10/1992 | Burns .................................... | 301/43 |
| 5,226,690 | 7/1993 | Clark et al. ........................... | 301/43 |
| 5,451,011 | 9/1995 | Kumm .................................. | 301/43 |

FOREIGN PATENT DOCUMENTS

| | | |
|---|---|---|
| 1013273 | 7/1952 | France . |
| 85217 | 1/1936 | Sweden . |
| 807132 | 1/1959 | United Kingdom . |
| 1033377 | 6/1966 | United Kingdom ................ 301/64.7 |

*Primary Examiner*—Russell D. Stormer
*Attorney, Agent, or Firm*—Zarley,McKee,Thomte,Voorhees & Sease

[57] ABSTRACT

A center pivot irrigation system tower support wheel includes first and second wheel halves, each of the wheel halves including a generally flat circular center hub section and an outwardly extending diverging wheel body section having a conic sidewall section extending at an angle relative to the hub section and an outer ground-engaging generally cylindrical wheel rim connected to the sidewall section and aligned generally perpendicular to the center hub section, the rim including an engagement surface spaced from the connection to the sidewall section. A connection structure is provided for connecting the engagement surfaces of the first and second wheel halves such that the first and second wheel halves form a support wheel having a generally flat circular wheel hub and a wheel body having a generally triangular cross-sectional shape with a generally broad outer surface formed by the generally cylindrical rims. Finally, a plurality of cleats are mounted on and extend outwardly from the outer surface of the cylindrical rims, each of the cleats including a ground-engaging outer cleat surface which is rounded, preferably semi-cylindrically, such that buildup of debris on the outer cleat surface is substantially reduced.

8 Claims, 5 Drawing Sheets

COMPOSITE HOLLOW IRRIGATION SYSTEM TOWER SUPPORT WHEEL

BACKGROUND OF THE INVENTION

1. Technical Field

This invention relates to wheels for irrigation systems and, more particularly, to an irrigation system tower support wheel having first and second wheel halves, each of the wheel halves including a generally flat circular center hub section and an outwardly extending diverging wheel body section having a conic sidewall section extending at an angle relative to the hub section and an outer ground-engaging cylindrical rim connected to the sidewall section, the wheel halves connected to one another to form the support wheel and the support wheel further including a plurality of cleats mounted on and extending outwardly from the wheel rim, each of the cleats including a rounded, semi-cylindrical outer ground-engaging surface.

2. Description of the Prior Art

The advent of irrigation systems has allowed for the use of much land which was previously unusable for the farming of crops. For example, much of the land in the American "grain basket" receives irregular amounts of rainfall which can severely restrict the yield per acre on those lands. Also, much of the land is hilly and uneven. Due to the irregularity of rainfall, however, irrigation systems must be employed even on hilly or uneven ground areas. As the majority of center pivot irrigation systems are propelled by powered rotation of their wheels, there is a need for an irrigation system tower support wheel which will provide sufficient traction for propulsion of the irrigation system even over uneven, hilly or muddy ground.

Presently, most irrigation systems use rubber tires as the wheels on the system. There are several disadvantages which become apparent when rubber tires are used in connection with an irrigation system, including the possibility of the rubber tire being punctured and thus deflating. It is well-known that continued use of the deflated rubber tire may result in irreparable damage to the tire, and as such tires are expensive, replacement of the entire tire can be financially draining to the user of the irrigation system. Furthermore, rubber tires often slip in mud when the treads of the tires become caked with mud, thus preventing motion of the irrigation system. The farmer must then go out into the field and free the stuck tire from the muddy area, which can be time-consuming. Finally, a major problem encountered in using rubber tires is that as the rubber tires travel over the ground, especially over wet ground, the rubber tires tend to form deep wheel ruts in the field which can cause damage to tractors running over the same ground, damage such as flat tires or cracked axles. Moreover, as the rubber tire moves through the rut, mud within the rut is pushed ahead of the tire and over the sides of the rut, thus increasing the depth of the rut. It is thus seen that rubber tires include a number of inherent deficiencies which need to be addressed and corrected.

Various irrigation system wheels have been proposed which attempt to address the problems encountered with rubber tires. Among these are such devices as Clark, deceased et al., U.S. Pat. No. 5,226,690, Siebert, U.S. Pat. No. 3,465,766, and Hieb, U.S. Pat. No. 3,993,249. Each of these prior art devices discloses a metal wheel having an outer rim with a plurality of radially-extending cleat plates. Each of these prior art devices, however, includes inherent drawbacks. For example, the radially-extending cleat plates can and often do gather large quantities of mud which can severely reduce the effective traction of the wheel. Therefore, the wheels can have too little traction to move the irrigation unit.

A different problem is encountered when wheels in the prior art are used in areas which have both dry and wet ground surfaces. Specifically, because of the relatively large ground-engaging surface area of each of the cleat plates, on most ground surfaces these types of wheels have a high degree of traction. Therefore, if one of the wheels of the irrigation system is slipping, the remaining wheels must work proportionately harder to move the irrigation system. When those steel wheels found in the prior art are used on irrigation systems, the cleat plates engage the ground surface and will not slip on many surfaces regardless of the rotational force applied to the wheel. The strain is then passed on to the drive shaft and motor, which can cause burnout or breakage of the drive elements. There is therefore a need for an irrigation wheel which provides sufficient traction over a variety of surfaces yet will slip in order to prevent motor or linkage damage.

Finally, both the all-steel tires shown in the prior art and the steel hub and rubber tires commonly used have inherent disadvantages due to the excessive weight of the wheels. For example, a standard rubber tire and steel hub combination weighs approximately 240 pounds and a steel wheel would have a weight of approximately 310 pounds. These weights mean it is virtually impossible for a single person to change a wheel in the field should that wheel become damaged, which represents a major inconvenience for solo farmers and the like. There is therefore a need for a light-weight replacement irrigation system wheel which can be changed by a single person.

Therefore, an object of the present invention is to provide an improved composite irrigation system tower support wheel.

Another object of the present invention is to provide a composite irrigation system tower support wheel which is constructed of a composite epoxy-glass fabric formed in a mold to create the wheel of the present invention.

Another object of the present invention is to provide a composite irrigation system tower support wheel which has a very high strength-to-weight ratio such that the composite wheel may replace those tires presently used on irrigation systems, and provide substantial savings in weight.

Another object of the present invention is to provide a composite irrigation system tower support wheel which includes first and second wheel halves, each wheel half including a generally flat circular center hub section and an outwardly extending diverging wheel body section having a conic sidewall section and generally cylindrical rim connected thereto, the first and second wheel halves connected to one another to form the support wheel and a plurality of cleats mounted on and extending outwardly from the outer surfaces of the cylindrical rims, each of the cleats including a ground-engaging rounded outer cleat surface which is preferably semi-cylindrical in shape.

Another object of the present invention is to provide a composite irrigation system tower support wheel which includes a plurality of radial ribs formed on each sidewall of the wheel to provide additional structural stability to the wheel.

Another object of the present invention is to provide a composite irrigation system tower support wheel whose structure permits some degree of slippage to prevent damage to the drive and motor in the event of other wheels on the irrigation system slipping.

Finally, an object of the present invention is to provide a composite irrigation system tower support wheel which is relatively simple in construction, sturdy and durable in use and light in weight.

SUMMARY OF THE INVENTION

The present invention provides a composite irrigation system tower support wheel for use in combination with an irrigation system having at least one tower support, irrigation devices and a drive motor, the support wheel including first and second wheel halves, each of the wheel halves including a generally flat circular center hub section and an outwardly extending diverging wheel body section having a conic sidewall section extending at an angle relative to the hub section and an outer ground-engaging generally cylindrical rim connected to the sidewall section and aligned generally perpendicular to the center hub section, the rim including an engagement surface spaced from the connection to the sidewall section. The engagement surfaces of the first and second wheel halves are connected to one another such that the first and second wheel halves form the support wheel having a generally flat circular wheel hub and a wheel body having a generally triangular cross-sectional shape with a generally broad outer surface formed by the generally cylindrical rims. Finally, a plurality of cleats are mounted on and extend outwardly from the outer surfaces of the cylindrical rims, each of the cleats further including a ground-engaging outer cleat surface, the outer cleat surface being rounded in a semicylindrical fashion such that buildup of debris on the outer cleat surface is substantially reduced.

The present invention thus provides a substantial improvement over those devices found in the prior art. The overall rounded contours of the wheel of the present invention provide limited opportunity for mud buildup which is a major problem on those wheels found in the prior art. Also, the rounded shape of each cleat allows a degree of slippage when the wheel is rotating, thus preventing damage to the drive motor which drives the irrigation system. Also, because of the construction materials used in the present invention, the weight of the wheel is substantially reduced as compared to those devices found in the prior art, making it feasible for a single person to remove and replace a broken or damaged wheel. Finally, because the wheel of the present invention is constructed of lightweight but extremely strong epoxy-glass fabric, the wheel is extremely durable and also highly weather-resistant, as the E-glass Fabric does not rust and is not prone to decay of any kind. It is thus seen that the present invention provides a substantial improvement over those wheels found in the prior art.

DESCRIPTION OF THE PREFERRED EMBODIMENT

Figure 1:
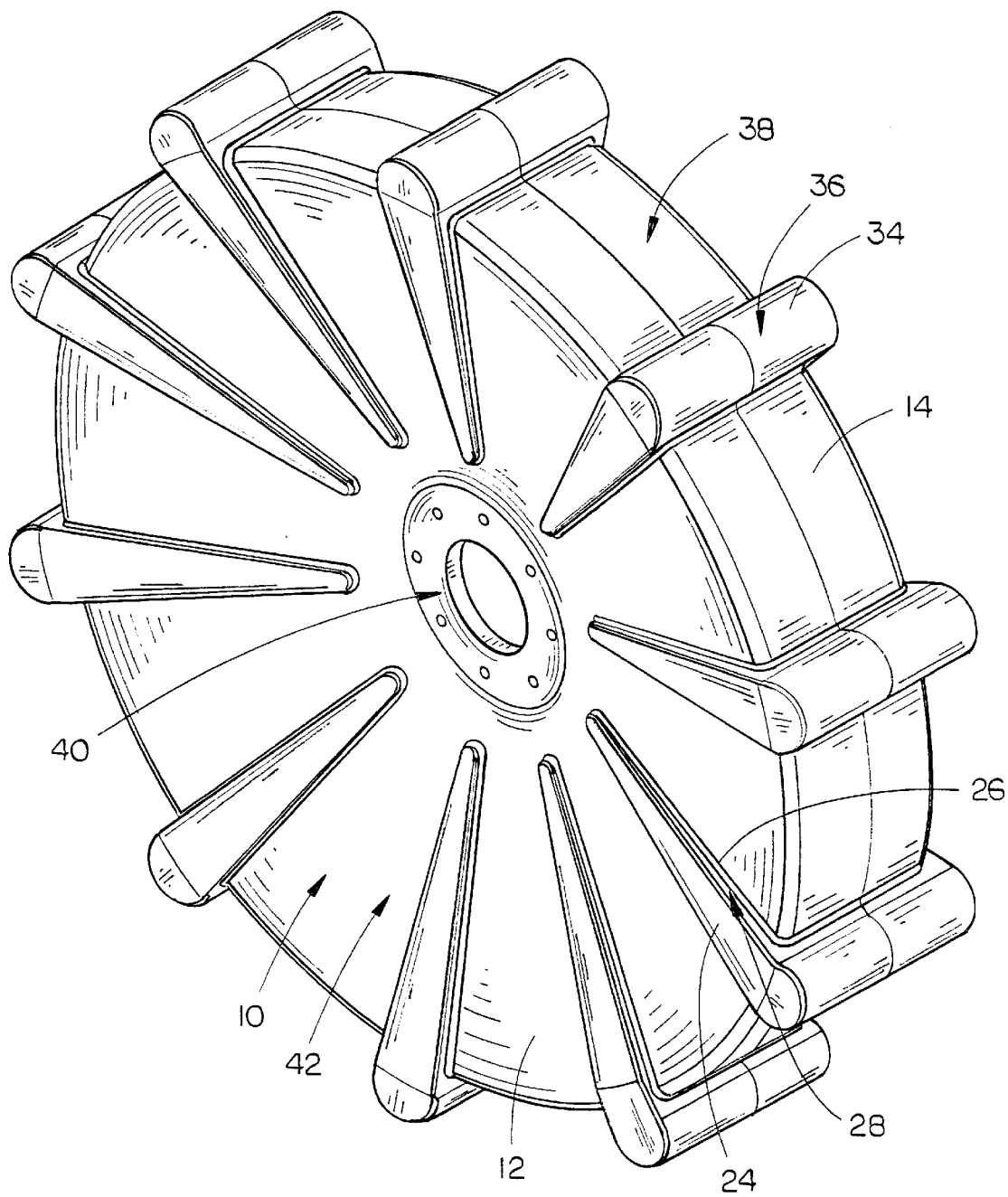
FIG. 1 is a perspective view of the composite wheel of the present invention.
Figure 2:
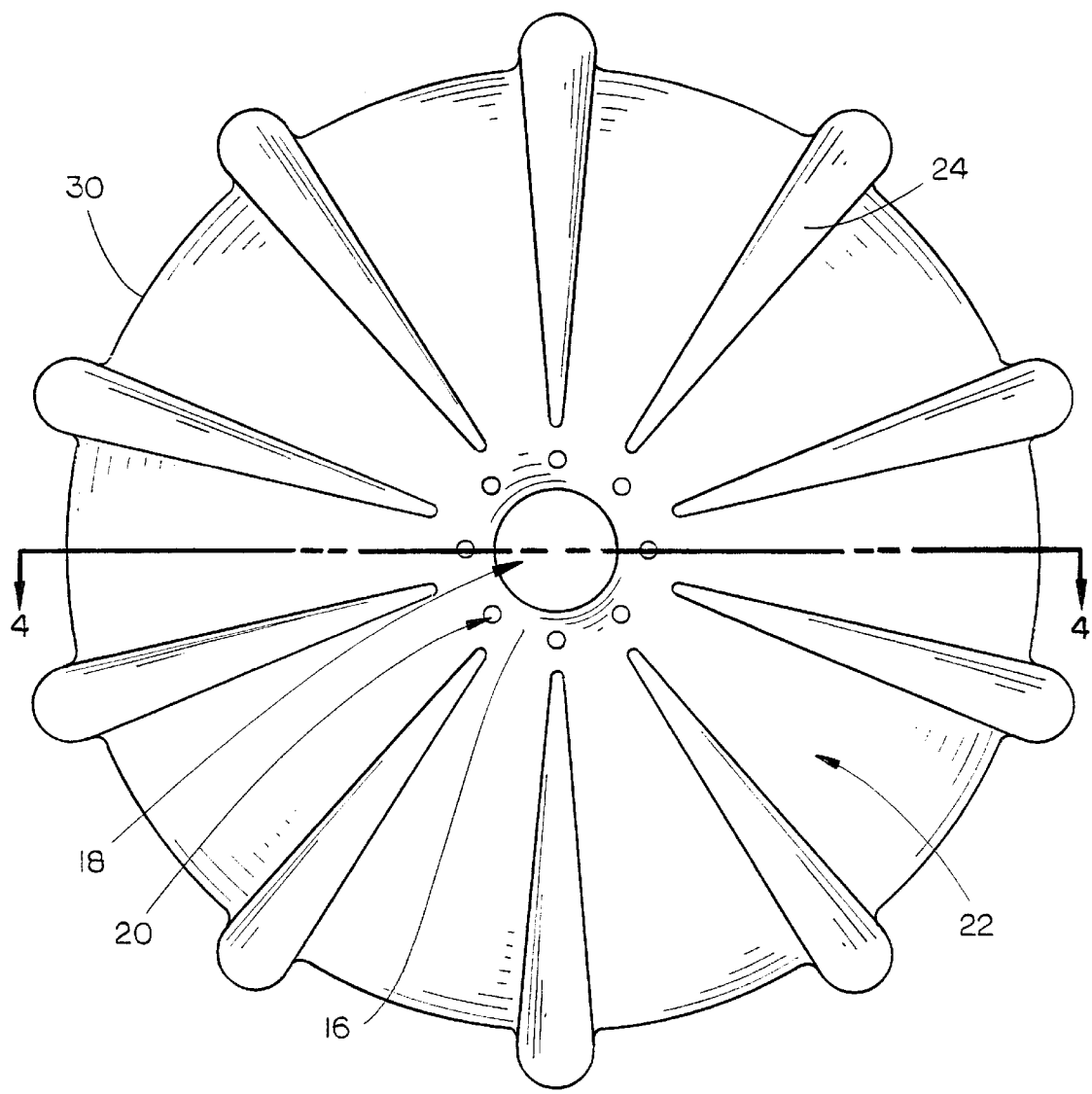
FIG. 2 is a side elevational view of the composite wheel.
Figure 3:
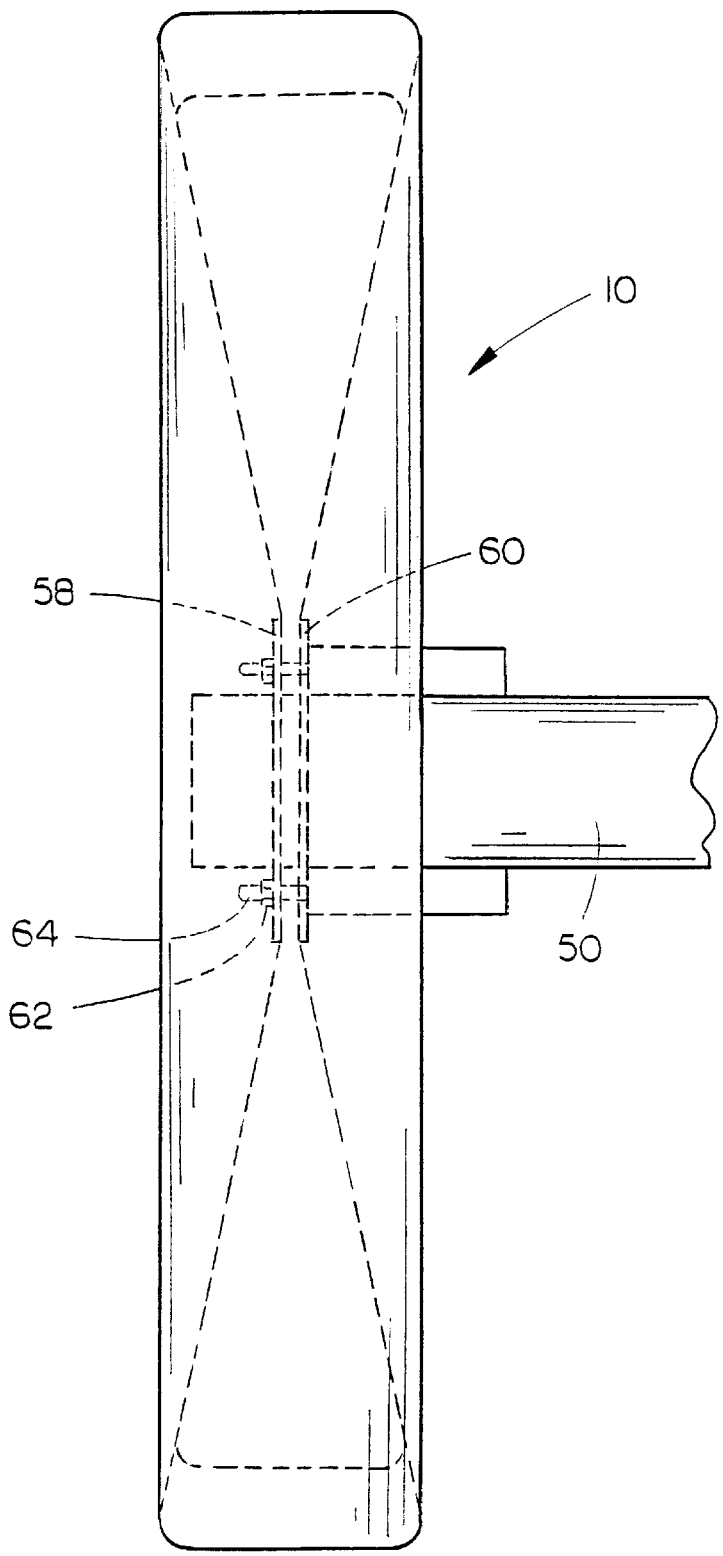
FIG. 3 is a front elevational view of the composite wheel mounted on an axle of a center-pivot irrigation system illustrating the connection between the flat hub and axle.

The composite wheel 10 of the present invention is shown best in FIGS. 1–3 as including first and second wheel halves 12 and 14 which are preferably substantially identical to one another. In fact, the only difference between first wheel half 12 and second wheel half 14 is that first wheel half 12 includes a recessed lap joint structure 44 formed on the engagement edge 32 of first wheel half 12. The lap joint detail (shown in FIG. 5) will be discussed further below. Presently, it is to be understood that while the following description pertains to first wheel half 12, the description is equally applicable to second wheel half 14, with the noted exception of the lap joint structure 44.

First wheel half 12 preferably is constructed of a fiberglass-type substance which has an extremely high tensile strength yet is extremely light in weight, an example of which is the Plain Weave E-glass fabric Style 7500 manufactured by Shell Company of America, and which can be quickly and easily molded into desired shapes by use of any of a number of different fiberglass molding techniques. It is also preferred that the fiberglass-type substance include further elements such as UV inhibitors to protect against breakdown due to sunlight exposure, curing compounds to allow the E-glass to set in the mold more quickly and coloring compounds to provide various shades and hues for the wheel 10. The features of the first wheel half 12 include a generally flat, circular rigid wheel hub 16 positioned at the center of the first wheel half 12. In the preferred embodiment, first wheel half 12 would have a diameter between 30 and 60 inches, and therefore wheel hub 16 would have a diameter preferably between 4 and 12 inches, depending upon the type of irrigation system to which the wheel of the present invention is to be fitted. The material thickness of wheel hub 16 is preferably between $\frac{1}{16}$" and $\frac{1}{2}$" thick depending upon the material used in construction and the structural strength desired. Wheel hub 16 further includes a central axle hole 18 and a plurality of bolt holes 20 surrounding axle hole 18, as shown best in FIG. 2. It is preferred that axle hole 18 be of sufficient size to accommodate one end of an irrigation system axle 50 in a similar fashion to that used in mounting those wheels found in the prior art. In this manner, the composite wheel 10 of the present invention is designed to replace existing wheels without requiring modification of the axle hub. Additionally, while FIG. 2 shows eight bolt holes 20, it is to be understood that the number of bolt holes is not critical to the present invention so long as a sufficient number of bolt holes 20 are included to properly attach the composite wheel 10 of the present invention to the irrigation tower axle 50.

Figure 4:
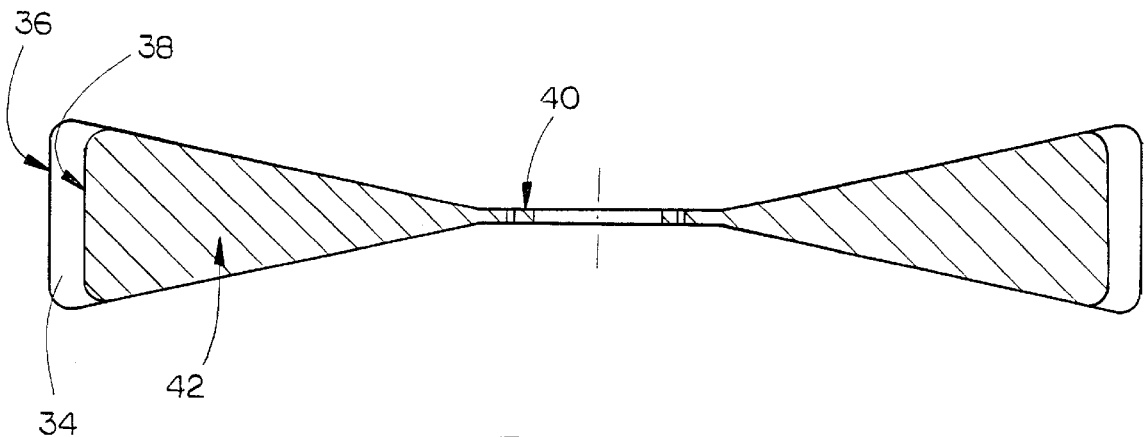
FIG. 4 is a top sectional view along line 4—4 of FIG. 2.

Extending radially outward from the wheel hub 16 is a shallow conic sidewall section 22 shown best in FIG. 4. It is preferred that the sidewall 22 have a thickness between $\frac{1}{16}$" and $\frac{1}{2}$", depending on the material used and the strength desired, and further that the sidewall section 22 be angled from the wheel hub 16, that angle preferably being between 9° and 20°, depending on the overall height of the wheel and the desired width of the ground-engaging wheel rim 30.

While sidewall section 22 could be formed with generally flat outer and inner surfaces, it is preferred that sidewall section 22 further include a plurality of raised radial ribs 24, each of which extends outwards from adjacent wheel hub 26 to the outer edge 23 of the sidewall section 22, as shown best in FIG. 2. While the composite wheel 10 of the present invention is shown with ten raised radial ribs 24 formed on sidewall section 22, it is to be understood that the exact number of ribs 24 used on the sidewall section 22 is not critical to the invention, and in fact, provided a sufficient thickness of construction material were used in constructing the sidewall section 22, radial ribs 24 may not be necessary. However, in the preferred embodiment, the raised radial ribs 24 provide additional structural strength to the sidewall section 22. Furthermore, each radial rib 24 tapers from a generally wide outer end to a generally narrow inner end adjacent wheel hub 16. It is preferred that each of the radial ribs 24 be raised approximately ½" above adjacent sidewall 22, although this dimension is adjustable, depending on the amount of structural strength desired to be added to the sidewall section 22. Dotted lines 26 adjacent each radial rib 24 represent the point at which sidewall section 22 and each raised radial rib 24 curve into one another, thus forming a gently rounded concave channel 28 surrounding each radial rib 24. It is to be understood that each channel 28 is above the height of the sidewall section 22 and connects the sidewall section 22 to the raised radial rib 24, and that the cross-sectional shape of the channel 28 is a curved L-shape which substantially reduces the opportunity for mud and other such sticky materials to adhere therein. It is also to be understood that numerous shapes and sizes of radial ribs 24 are acceptable for use with the present invention.

Figure 5:
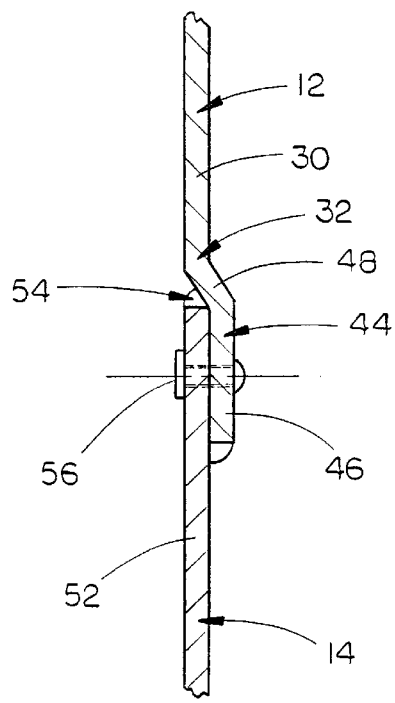
FIG. 5 is a partial sectional detailed view of the lap joint between the two halves of the composite wheel exhibiting the adhesive securing the sections together and the top rivet extending through the lap joint to further secure the wheel halves to one another.

First wheel half 12 further includes a ground-engaging wheel rim 30 which is connected to the outer edge 23 of sidewall section 22 and is generally perpendicular to wheel hub 16, as shown best in FIG. 4. It is preferred that the width of ground-engaging wheel rim 30 be between 4 and 6 inches and that the wheel rim 30 have a generally cylindrical shape, as shown best in FIGS. 1 and 2. It is preferred that the connection between ground-engaging wheel rim 30 and the outer edge 23 of sidewall section 22 be generally rounded as in a rubber tire to increase the structural strength of the connection between the ground-engaging wheel rim 30 and sidewall section 22 and reduce the formation of ruts in the field. It is preferred that the thickness of the ground-engaging wheel rim 30 be similar to that described in connection with sidewall 22. It is further preferred that wheel rim 30 of first wheel half 12 include an engagement edge 32 which is adapted to be connected to a lap joint section 44, as shown in FIGS. 4 and 5.

Wheel rim 30 further includes a plurality of outwardly projecting traction cleats 34 which consist of a plurality of semi-cylindrical projections each extending generally parallel with the wheel rim 30 and generally perpendicular to wheel hub 16, as shown best in FIGS. 1–4. Each traction cleat 34 would preferably have similar dimensions as follows; the height of the traction cleat would be approximately 3 inches and the width of the traction cleat would be approximately 4 inches, although these dimensions may be modified as desired to obtain greater or lesser degrees of traction. It is important, however, that each traction cleat 34 have the semi-cylindrical shape such that each cleat may provide a substantial degree of traction but will slip should the stress on the drive shaft or motor attached to the axle 50 become too great. Therefore, the composite wheel 10 of the present invention is designed to slip when other wheels on the irrigation system are stuck, thus preventing damage to the drive shaft and motor connected to the specific wheel 10.

An important feature of the traction cleats 34 is that the portion where the traction cleats 34 contacts the wheel rim 30 is concavely rounded as was previously described in connection with channel 28, which was the connection between the radial ribs 24 and sidewall section 22. The curved connection between the traction cleats 34 and wheel rim 30 acts to prevent substantial mud buildup between the cleat 34 and wheel rim 30, thus maintaining the full traction capabilities of the composite wheel 10 of the present invention even after the wheel has been used in muddy areas. The thickness of each of the traction cleats 34 should be approximately the same as the thickness of the wheel rim 30, but may be increased to provide additional structural rigidity as the traction cleats 34 will bear the entire weight of the irrigation system tower at certain points during rotation of the composite wheel 10.

FIG. 4 best shows how each traction cleats 34 extends beyond sidewall section 22 and is substantially seamlessly connected to a specific radial rib 24. FIGS. 1 and 2 illustrate this connection and display how the radial ribs 24 and traction cleats 34 are preferably formed as continuous units during the molding process to provide for increased structural strength of the composite wheel 10. Therefore, in the preferred embodiment, the number of cleats 34 would be equal to the number of radial ribs 24, but it is to be understood that any number of cleats 34 may be included on the wheel rim 30 of the present invention so long as the cleats 34 provide sufficient traction. In fact, various diameters of wheel 10 may require different numbers of cleats on the wheel rim 30.

As was discussed previously, the composite wheel 10 is formed of a first wheel half 12 and a second wheel half 14 which are joined together as best shown in FIGS. 1–4. It is preferred that the traction cleats 34 on first wheel half 12 align with the traction cleats 34 on second wheel half 14 such that each of the semi-cylindrical traction cleats 34 extend entirely across the ground-engaging rim 38 of composite wheel 10. It is preferred that the overall width of ground-engaging rim 38 be between 8 and 12 inches, although this width may be varied depending on the desired traction capabilities and required wheel size to be used on the irrigation system.

In the preferred embodiment, composite wheel 10 would have a generally hourglass-shaped cross-section which includes the generally flat wheel hub 40 and the quasi-toroidal rigid wheel body 42. Therefore, a cross-section of the wheel body 42 would have a generally triangular shape, as shown in FIG. 4. It is also preferred that the wheel body 42 be generally hollow to provide further weight savings in the composite wheel 10 of the present invention. Specifically, a standard 54" in diameter and 11" in width composite wheel 10 would have a weight of approximately 35 pounds when the construction material discussed previously is used. It is thus seen that the composite wheel 10 of the present invention provides a substantial savings in weight over those wheels found in the prior art.

FIG. 5 discloses the preferred connection means between first wheel half 12 and second wheel half 14. It is preferred that first wheel half 12 include a lap joint structure 44 mounted on engagement edge 32 which would preferably include an offset underlap section 46 and an angled offset section 48 which angles inwards from the engagement edge 32 of wheel rim 30. The offset section 48 is designed to offset underlap section 46 from wheel rim 30 such that the wheel rim on second wheel half 14 may abut engagement edge 32 at substantially the same height to allow first and second wheel halves 12 and 14 to connect to form composite wheel 10, the rim 38 not including substantial projections.

In the preferred embodiment, underlap section 46 and offset section 48 would be formed around the entire circumference of wheel rim 30 on first wheel half 12 to provide continuous contact with second wheel half 14, thus preventing mud and debris from entering the interior of composite wheel 10. However, underlap section 46 and offset section 48 need not be continuous and may in fact be formed as a plurality of tabs spaced equidistantly around the circumference of wheel rim 30.

First and second wheel halves 12 and 14 are joined together by sliding of wheel rim 52 of second wheel half 14 over underlap section 46 of lap joint structure 44 as shown in FIG. 5. Immediately prior to the above step, it is desirable to place a quantity of a known adhesive on underlap section 46 such that as wheel rim 52 is slid over underlap section 46, the adhesive material is spread between wheel rim 52 and underlap section 46, thereby securing first and second wheel halves 12 and 14 to one another. FIG. 5 further shows that some of the adhesive material 54 is "squeezed out" due to the close-fitting contact between wheel rim 52 and underlap section 46. Adhesive material 54 may be any of a number of commercially available adhesives, although it is believed that epoxy-based adhesives may be the most suitable for use with the present invention.

It is believed that adhesive material 54 will provide sufficient bonding strength to secure first and second wheel halves 12 and 14 to one another. However, for reasons of added safety, it may be desirable to further include a plurality of pop rivets 56 at spaced locations on wheel rim 38 of composite wheel 10, the pop rivets 56 extending through the outer edge of wheel rim 52 of second wheel half 14 and through underlap section 46 of lap joint engagement edge 44, thus securing wheel rim 52 to underlap section 46 and thereby securing first and second wheel halves 12 and 14 to one another. It is preferred that pop rivets 56 be equidistantly spaced around the circumference of composite wheel 10, as shown best in FIG. 1.

Of course, it may prove efficient to form composite wheel 10 of the present invention as a single unit by using molding techniques commonly used with rubber and plastics. One commonly used technique would be an injection molding process which would form the composite wheel 10 of the present invention as a single unit. Advantages in using such a molding process would include the fact that the unitary wheel 10 would have increased structural strength due to the continuous wheel rim and that injection molding processes which form unitary units usually require less time than those procedures described previously. However, we are unaware at the present time of any molding process which is as easily performed as the molding process presently used for the composite wheel 10 of the present invention in which the first and second wheel halves 12 and 14 are separately molded then combined to form the completed composite wheel 10.

Figure 6:
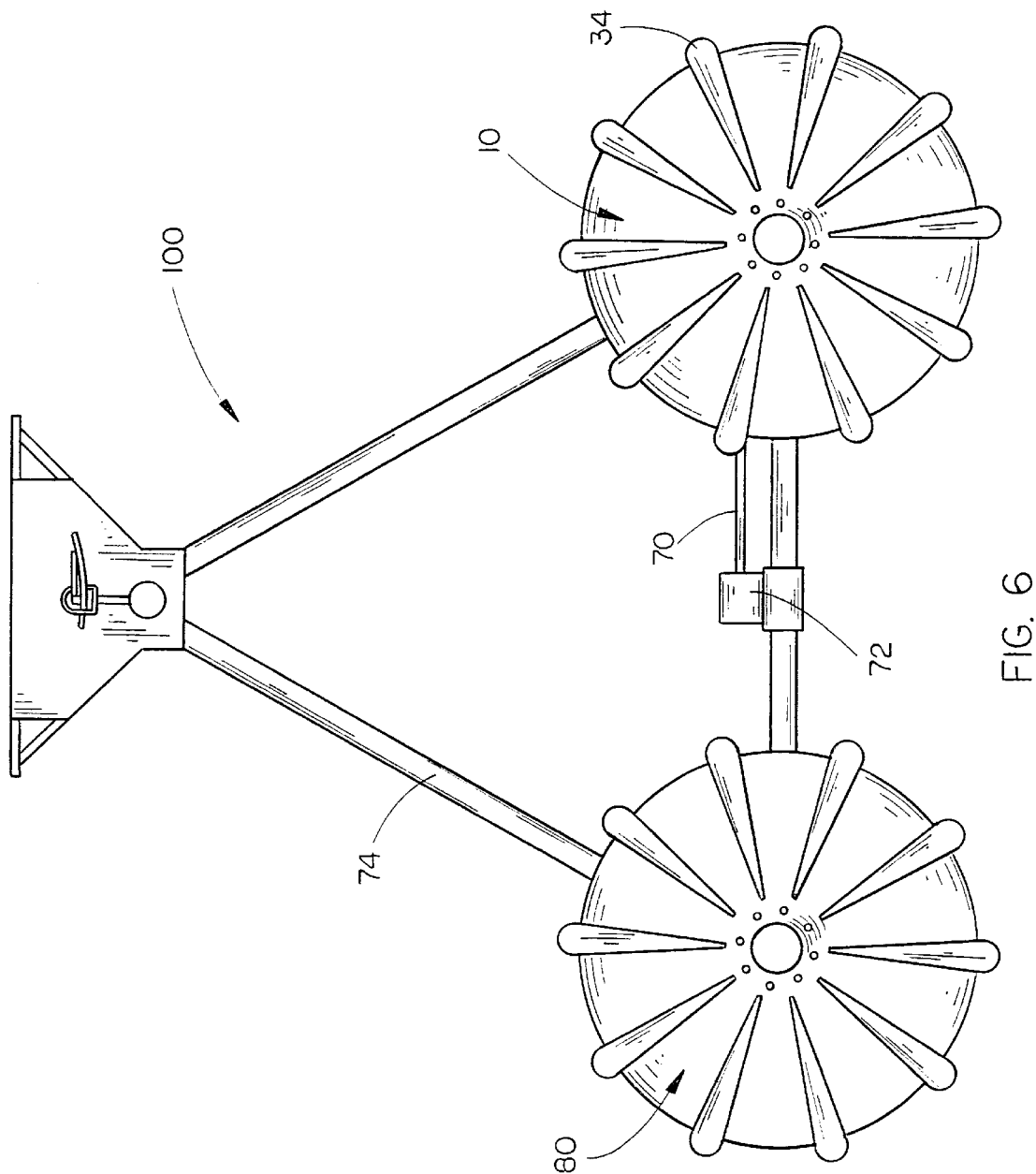
FIG. 6 is a perspective view of an irrigation system tower fitted with the wheels of the present invention.

FIGS. 3 and 6 display how the composite wheel 10 of the present invention is preferably mounted on an irrigation system 100. It is preferred that wheel hub 40 of composite wheel 10 further include a pair of circular metal rings 58 and 60, each ring 58 and 60 positioned on the exterior of wheel hub 10, one adjacent each of the first and second wheel halves 12 and 14. These are included to prevent damage to the wheel hub 40 and composite wheel 10 when the nuts 62 on bolts 64 connected to axle 50 are tightened down to secure composite wheel 10 to axle 50. Axle 50 extends through axle hole 18 as shown in FIG. 3 and the bolts 64 extend through bolt holes 20 to allow for securement of composite wheel 10 on axle 50. Nuts 62 are then tightened down in the usual manner to secure composite wheel 10 on axle 50. In a similar manner, the remaining wheels of the irrigation system 100 may be replaced with the composite wheel 10 of the present invention. Of course, it may not be necessary to include a metal ring 58 and 60 on one side of composite wheel 10 if composite wheel 10 is contacting axle 50, but it is preferred that metal rings 58 and 60 be provided to prevent substantial damage to composite wheel 10.

FIG. 6 best discloses how the composite wheel 10 of the present invention is designed to prevent failure of drive shaft 70 or electric motor 72 on the irrigation system support tower 74. For example, if rear composite wheel 80 were to begin slipping as it was passing through a muddy area, composite wheel 10 would consequently require more torque to rotate the wheel 10 and move the tower 74. With many of the metal wheels of the prior art, the drive motor 72 would apply force to the drive shaft 70 and thus to composite wheel 10 until either tower 74 moved or shaft 70 or drive motor 72 failed. With the composite wheel 10 of the present invention, however, upon a specific degree of torque being applied to composite wheel 10, the traction cleats 34, due to the rounded outer surface 36 of traction cleat 34, would allow composite wheel 10 to slip until both composite wheel 10 and rear composite wheel 80 on tower 74 were able to move tower 74. Damage to drive shaft 70 and drive motor 72 is thus prevented.

It is to be understood that numerous modifications, additions and substitutions may be made to the composite wheel 10 of the present invention which fall within the intended broad scope of the appended claims. For example, the composite wheel 10 may be constructed of various materials so long as the rounded shape of the cleats and the hourglass cross-sectional shape of the wheel is maintained. Also, the dimensions of the wheel 10 may be varied depending on the requirements of the user of the wheel. Finally, the number and location of the various elements of the wheel described previously may be modified so long as the general structure of the wheel is maintained.

There has thus been set forth and described a composite irrigation system tower support wheel which accomplishes at least all of the stated objectives.

We claim:

1. In combination:
   a self-propelled irrigation system having at least one tower support, irrigation means and drive means,
   at least one tower support wheel mounted on said tower support for propelling said tower support;
   said tower support wheel comprising:
      first and second wheel halves, each of said wheel halves including a generally flat circular center hub section and an outwardly extending diverging wheel body section having a conic sidewall section extending at an angle relative to said hub section and an outer ground-engaging generally cylindrical rim connected to said sidewall section and aligned generally perpendicular to said center hub section, said rim including an engagement surface spaced from said connection to said sidewall section and an outer rim surface;
      means for connecting said engagement surfaces of said first and second wheel halves such that said first and second wheel halves form said support wheel having a generally flat circular wheel hub and a wheel body having a generally triangular cross-sectional shape with a generally broad outer surface formed by said generally cylindrical rims;
      a plurality of cleats mounted on and extending outwardly from said outer surfaces of said cylindrical rims, each of said cleats further including a ground-engaging outer cleat surface; and said ground-engaging outer cleat surface being rounded such that buildup of debris on said outer cleat surface is substantially reduced;

said ground-engaging outer surfaces of each of said cleats being generally semi-cylindrical, each cleat further including a center longitudinal axis, said center longitudinal axis of each of said cleats being aligned generally perpendicular to said center hub section, each of said cleats extending substantially across said cylindrical rims of said first and second wheel halves.

2. The wheel of claim 1 wherein said first and second wheel halves are constructed of a light weight, rigid, high tensile strength fibrous material.

3. The wheel of claim 1 wherein said center hub section of each of said first and second wheel halves further comprises a central axle hole and a plurality of bolt holes formed around a periphery of said axle hole, said axle hole and said bolt holes extending generally perpendicularly through each of said center hub sections, each of said center hub sections including generally identically formed axle holes and bolt holes such that upon said first and second wheel halves being joined together, said axle holes and said bolt holes in said center hub sections are generally concentrically aligned.

4. The wheel of claim 1 further comprising at least one circular metal ring for attachment adjacent and generally concentric with said center hub section, said circular metal ring operative to protect said center hub section against damaging contact with bolts and nuts on an irrigation system axle.

5. The wheel of claim 1 wherein said conic sidewall sections of each of said first and second wheel halves further comprise radial stiffening ribs formed thereon and extending outwards from adjacent said center hub section towards said outer ground-engaging cylindrical rim such that each of said sidewall sections have increased structural strength.

6. The wheel of claim 1 wherein said means for connecting said engagement surfaces of said first and second wheel halves comprises a lap joint structure mounted on one of said first and second wheel halves, said lap joint structure mounted adjacent said engagement surface and including an offset section extending generally inwards towards said center hub section and an underlap section extending from a lower end of said offset section, said underlap section extending generally parallel with said cylindrical rim of said wheel half such that upon said engagement surfaces of said first and second wheel halves abutting one another, said underlap section of said lap joint structure extends beneath one of said generally cylindrical rims for securement thereto.

7. The wheel of claim 6 wherein said means for connecting said engagement surfaces of said first and second wheel halves further comprises an adhesive for bonding said wheel halves to one another.

8. In combination:

a self-propelled irrigation system having at least one tower support, irrigation means and drive means, at least one tower support wheel mounted on said tower support for propelling said tower support;

said tower support wheel comprising:

a generally flat, circular, rigid wheel hub for connection to an axle;

a quasi-toroidal rigid wheel body having a generally narrow inner and a generally broad outer surface and having a generally triangular cross-sectional shape;

said wheel hub generally concentrically mounted within said wheel body such that an outer circumference of said wheel hub is connected to said inner surface of said wheel body whereby said wheel hub and said wheel body form said support wheel;

a plurality of cleats mounted on and extending outwardly from said outer surface of said wheel body, each of said cleats further including a ground-engaging outer surface; and said ground-engaging outer surface of each cleat being rounded such that buildup of debris adjacent each cleat on said wheel body is substantially reduced;

each of said cleats being generally semi-cylindrical, each cleat further including a center longitudinal axis, said center longitudinal axis of each of said cleats being aligned generally perpendicular to said center hub section, each of said cleats extending substantially across said cylindrical rims of said first and second wheel halves.

* * * * *